United States Patent [19]
Ho et al.

[11] Patent Number: 5,936,790
[45] Date of Patent: Aug. 10, 1999

[54] SERVO SECTOR ALLOCATION FOR HIGH SAMPLING RATE

[75] Inventors: Hai Ho, Westminster; Toan Doan, Lafayette, both of Colo.

[73] Assignee: Maxtor Corporation, Longmont, Colo.

[21] Appl. No.: 08/707,339

[22] Filed: Sep. 3, 1996

[51] Int. Cl.⁶ ..................................................... G11B 5/09
[52] U.S. Cl. ..................... 360/77.05; 360/77.08
[58] Field of Search ............... 360/77.05, 77.08, 360/77.04, 77.14, 77.07, 77.11, 77.02

[56] References Cited

U.S. PATENT DOCUMENTS

| | | | |
|---|---|---|---|
| 3,994,016 | 11/1976 | Moghadam | 360/77 |
| 4,072,990 | 2/1978 | Case et al. | 360/77 |
| 4,377,827 | 3/1983 | Rose | 360/78.04 |
| 4,918,677 | 4/1990 | Ashinuma et al. | 360/78.14 |
| 5,053,897 | 10/1991 | Ikeshita | 360/77.04 |
| 5,109,307 | 4/1992 | Sidman | 360/77.05 |
| 5,117,408 | 5/1992 | Weispfenning et al. | 360/77.05 |
| 5,153,787 | 10/1992 | Sidman | 360/77.05 |

*Primary Examiner*—Nabil Hindi
*Attorney, Agent, or Firm*—Sheridan Ross P.C.

[57] ABSTRACT

A servo sector allocation scheme for a disk based data storage system is disclosed that realizes an increased servo sampling rate without an associated increase in overhead. The scheme involves increasing the number of servo sectors on a subset (preferable one) of the disk surfaces in the disk drive while reducing the number on all remaining disk surfaces. A master servo feedback signal is then derived from the highly populated surface(s) and a slave servo feedback signal is derived from the surface that is being accessed. The master and slave servo feedback signals are then combined to form a single position error signal that is used to control the positioning of an appropriate transducer.

28 Claims, 7 Drawing Sheets

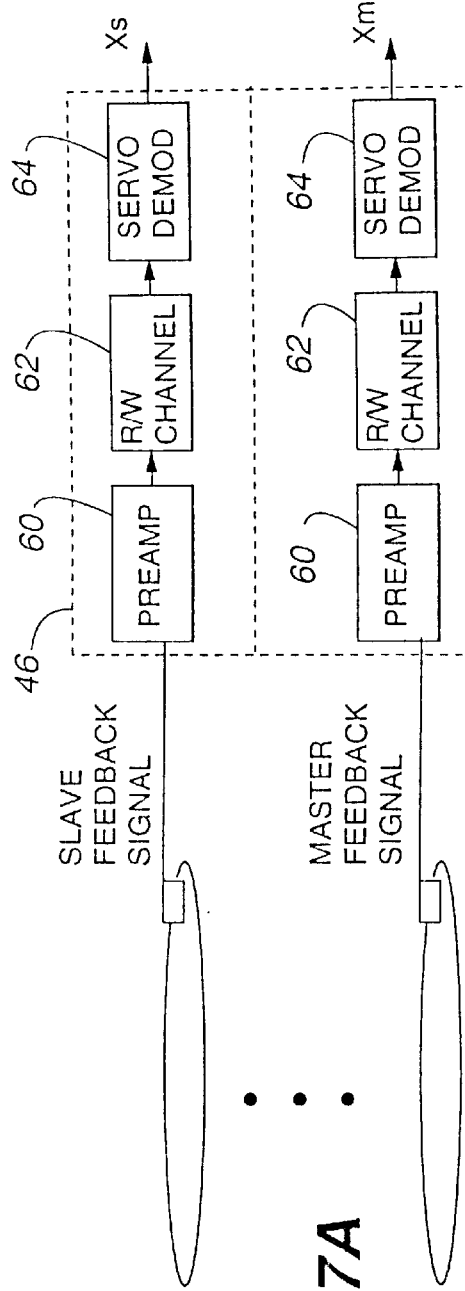
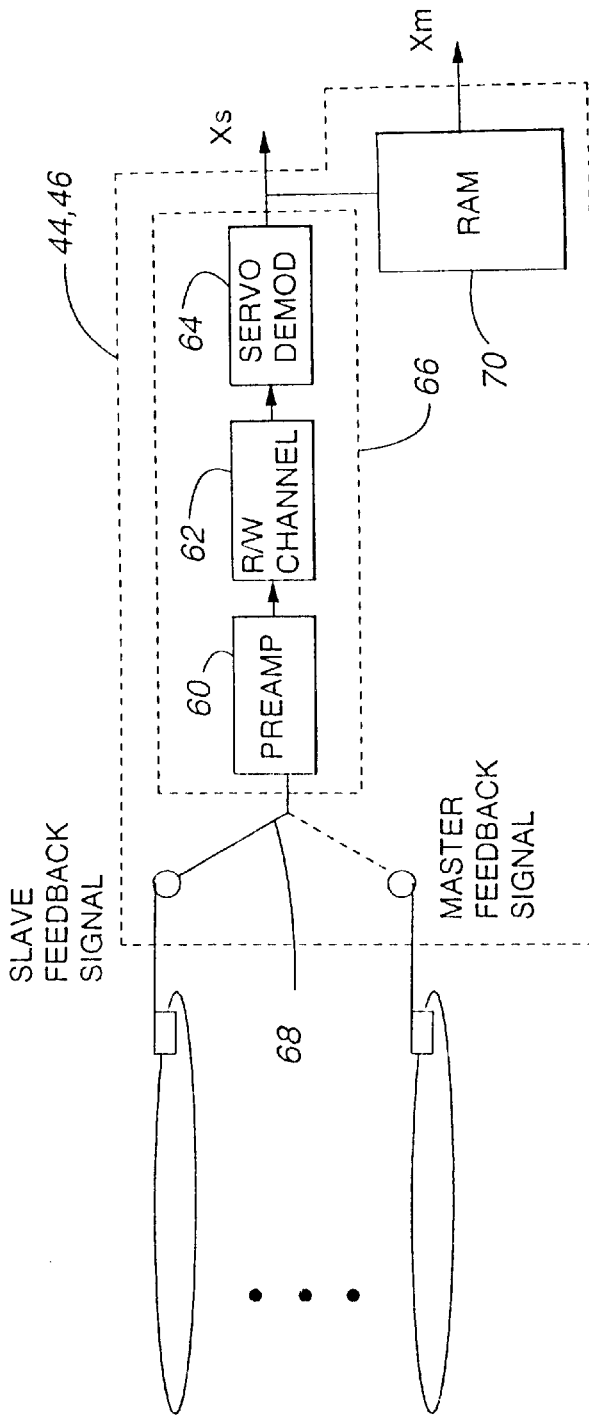
Fig. 7A
Fig. 7B

SERVO SECTOR ALLOCATION FOR HIGH SAMPLING RATE

FIELD OF THE INVENTION

The present invention relates in general to disk based data storage systems and, more particularly, to the storage and use of servo positioning information in such systems.

BACKGROUND OF THE INVENTION

A disk drive is a non-volatile mass storage device for use in conjunction with a computer system. In this regard, disk drives are capable of storing relatively large amounts of information, such as computer programs and user data, for use on demand by the computer system. Disk drives generally include at least one disk for storing information, a spin motor for rotating the disk at a substantially constant angular speed, at least one transducer for use in transferring information between each disk surface and an exterior environment (e.g., a host computer), an actuator assembly for supporting each transducer in proximity to the corresponding disk during operation of the disk drive, a motor means for imparting motion to the actuator assembly in response to a control signal, and a servo control unit for generating the control signal for the motor means to controllably move the transducer with respect to the disk.

During operation of the disk drive, the at least one disk is rotated about an axis at a substantially constant angular speed. If the disk drive includes multiple disks, they are all axially aligned and rotated at the same speed. To transfer information from the exterior environment to a track on one of the disks (i.e., to perform a write operation), an appropriate transducer is first centered above the desired track and then a write signal is delivered to the transducer to cause a corresponding change on the track. Similarly, to transfer information from a desired track to the exterior environment, an appropriate transducer is centered above the desired track where it senses the information stored on the track to produce a read signal indicative of the information stored on the track.

The servo control unit is used to center the appropriate transducer above the desired track. The servo control unit receives information indicating the present location of the transducer and the desired location of the transducer. The servo control unit then uses this information to create an error signal which serves as the control signal for the motor means. The information indicating the present location of the transducer is generally read by the transducer from at least one of the disk surfaces in the disk drive. The information may be stored on the actual disk surface which is being accessed or it may be located on another disk surface in the system. That is, multiple methods exist for storing servo positioning information on the disks of the disk drive.

One technique for storing servo information in a disk drive is known as dedicated servo. In a system using dedicated servo, all of the servo information is stored on a single disk surface in the drive. For example, in a two disk dedicated servo system having four disk surfaces, one of the disk surfaces is dedicated to servo information and the other three surfaces contain only user information. The servo information on the one servo surface is used to control the positioning of transducers relative to the other three surfaces. Dedicated servo systems performed adequately when relatively low track densities were being used in the industry. However, as track densities increased over time, it was found that thermal drift produced too much positional variance from transducer to transducer to successfully implement the dedicated servo technique.

Another technique for storing servo information in a disk drive system is known as sectored (or embedded) servo. In a disk drive system using sectored servo, each track on each disk surface in the system includes a plurality of servo sectors containing the required servo information. As the transducer reads/writes user information from/to a desired track, the servo sectors on the track are periodically sampled to provide the required position information to the servo control unit. Because the transducer that is doing the reading/writing of user information is the same transducer that is reading the servo information, thermal drift is not a problem. However, if the servo sector sampling rate being used is too low, the system's bandwidth and disturbance rejection capabilities can be severely limited resulting in poor track following and runout disturbance rejection capabilities.

In an effort to improve the servo sampling rate of a disk drive system, while still maintaining resistance to negative thermal drift effects, hybrid systems were developed that used a dedicated servo surface in conjunction with servo sectors on the other surfaces in the system. In this way, thermal effects could be rejected and a continuous stream of servo information was still available to the servo system. Hybrid systems generally perform well; however, these systems contain a relatively large amount of overhead because a fully dedicated servo surface is required in addition to the servo sectors on the data surfaces.

Therefore, a need exists for a servo technique that produces a relatively high servo sampling rate, that is not significantly affected by thermal drift, and that requires less overhead than prior hybrid servo techniques.

SUMMARY OF THE INVENTION

The present invention fulfills the above described needs by providing a sectored servo allocation technique that uses a greater number of servo sectors on one (or less than all) of the disk surfaces in the drive than on the other disk surfaces, but that allows user data to be stored on all of the disk surfaces. That is, every disk surface in the drive contains both servo sectors and data sectors, however, one surface (or less than all surfaces) in the drive contains more servo sectors than the other surfaces. In this fashion, a relatively high servo sampling rate is achieved by using the surface having the increased number of servo sectors to produce a "master" servo feedback signal, while the surface including the track being accessed produces a "slave" servo feedback signal. The master signal and the slave signal are then combined into a composite signal having a relatively high servo sample update rate. The slave signal provides the compensation needed to correct for thermal drift effects (and any other effects causing positional variance between transducers) in the drive. The invention may be used, for example, to increase the servo sampling rate of a disk drive while maintaining a current overhead level, to decrease overhead level while maintaining a current servo sampling rate, or to both increase servo sampling rate and decrease overhead level. The technique has application in any type of disk based data storage system which is capable of using a sectored servo scheme, such as magnetic and/or optical systems, especially those having relatively high track densities.

BRIEF DESCRIPTION OF THE DRAWINGS

FIGS. 7A and 7B are diagrams illustrating two different implementations of position error signal (PES) circuitry in accordance with one embodiment of the present invention.

DETAILED DESCRIPTION

The present invention relates to a servo technique for use in a disk drive system that provides a relatively high servo sample rate while requiring relatively little overhead. The technique is a sectored servo technique that involves using a relatively large number of servo sectors on one of the disk surfaces in the drive and a relatively small number on the other disk surfaces in the drive. During a read/write operation involving one of the other disk surfaces, a master servo feedback signal is derived from the highly populated surface and a slave servo feedback signal is derived from the servo sectors on the drive surface being accessed. The two feedback signals are then combined into a servo error signal having a high servo update rate and which is corrected for thermal drift. During a read/write operation involving the highly populated surface, only the master feedback signal is used to create the servo error signal. The technique generally requires the same or less overhead than a comparable system using conventional sectored servo while producing a substantially greater servo sample rate and, hence, better track following and disturbance rejection.

Figure 1:
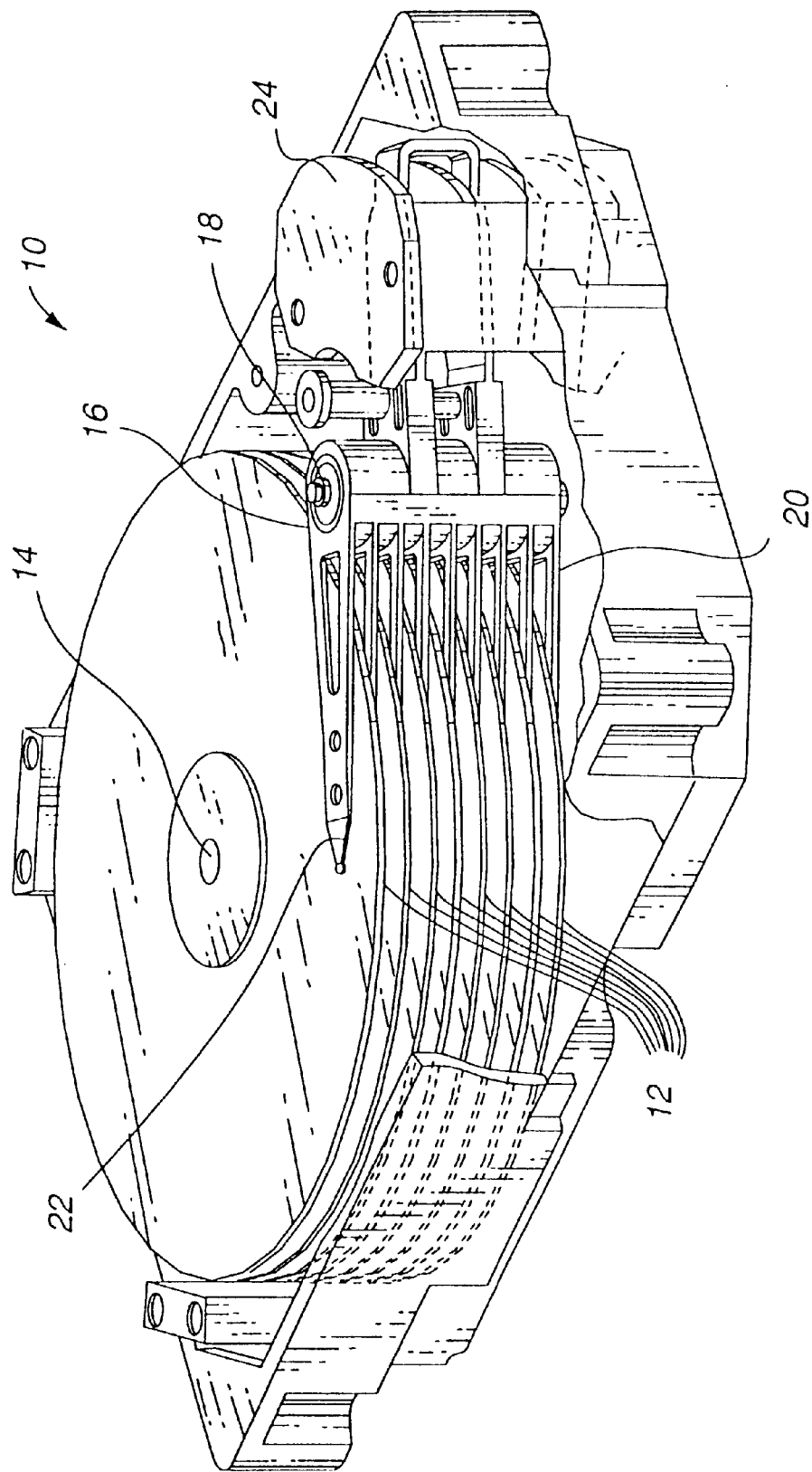
FIG. 1 is a perspective view of a disk drive system that can use features of the present invention.
Figure 2:
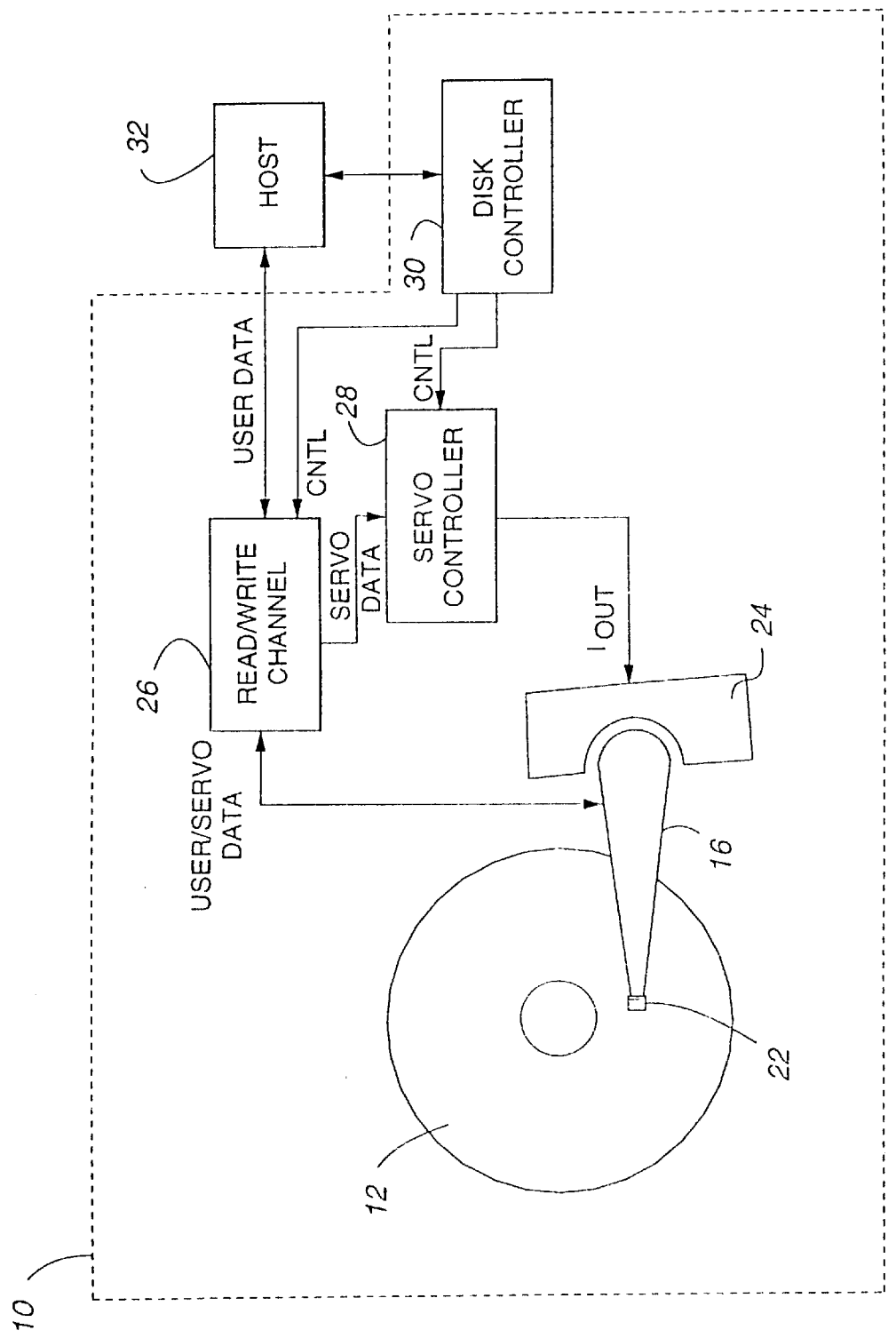
FIG. 2 is a block diagram of a disk drive system that can use features of the present invention.

FIG. 1 is a perspective view of a disk drive system 10 in which the present invention can be implemented. The system 10 includes: a plurality of disks 12 mounted to a rotatable hub 14, each disk having a pair of disk surfaces that each include a plurality of separate tracks (not shown) for storing data; a spin motor (not shown) coupled to the rotatable hub for spinning the plurality of disks at a substantially constant rate; an actuator assembly 16 that pivots about an axis 18 and includes a plurality of individual actuator arms 20, each carrying at least one transducer 22; and a voice coil motor 24 coupled to the actuator assembly 16 for imparting motion to the assembly and, therefore, to the transducers 22, in response to a control signal. As illustrated in the block diagram of FIG. 2, the disk drive system 10 also includes: a read/write channel 26; a servo controller 28, and a disk controller 30.

During operation of the system 10, commands are received by the disk controller 30 from an external host computer 32 requesting that read and/or write operations be performed by the system 10. For example, the host 32 may request that data be read from a particular data sector on a particular track on the upper surface of the top disk. The disk controller 30 then signals the servo controller 28 to deliver a control signal (i.e., Iout) to the VCM 24 that will move the actuator assembly to (during a seek operation), and maintain it at (during a track following operation), a position where the appropriate transducer 22 is centered above the desired track.

To create the servo control signal, the servo controller 28 uses servo information read from the disk surface being accessed. The servo information is indicative of, among other things, the present location of the appropriate transducer. The servo information is delivered to the servo controller 28 via the read/write channel 26 where it is separated from user data also read from the disk surface by the transducer. When the servo controller determines that the transducer 22 is just passing over the appropriate track and sector, it allows the analog read signal from the transducer to be processed in the read/write channel (where it is converted to a form recognizable to the host computer 32) and delivered to the host 32. A similar, but reversed, procedure is followed during a write operation.

Figure 3:
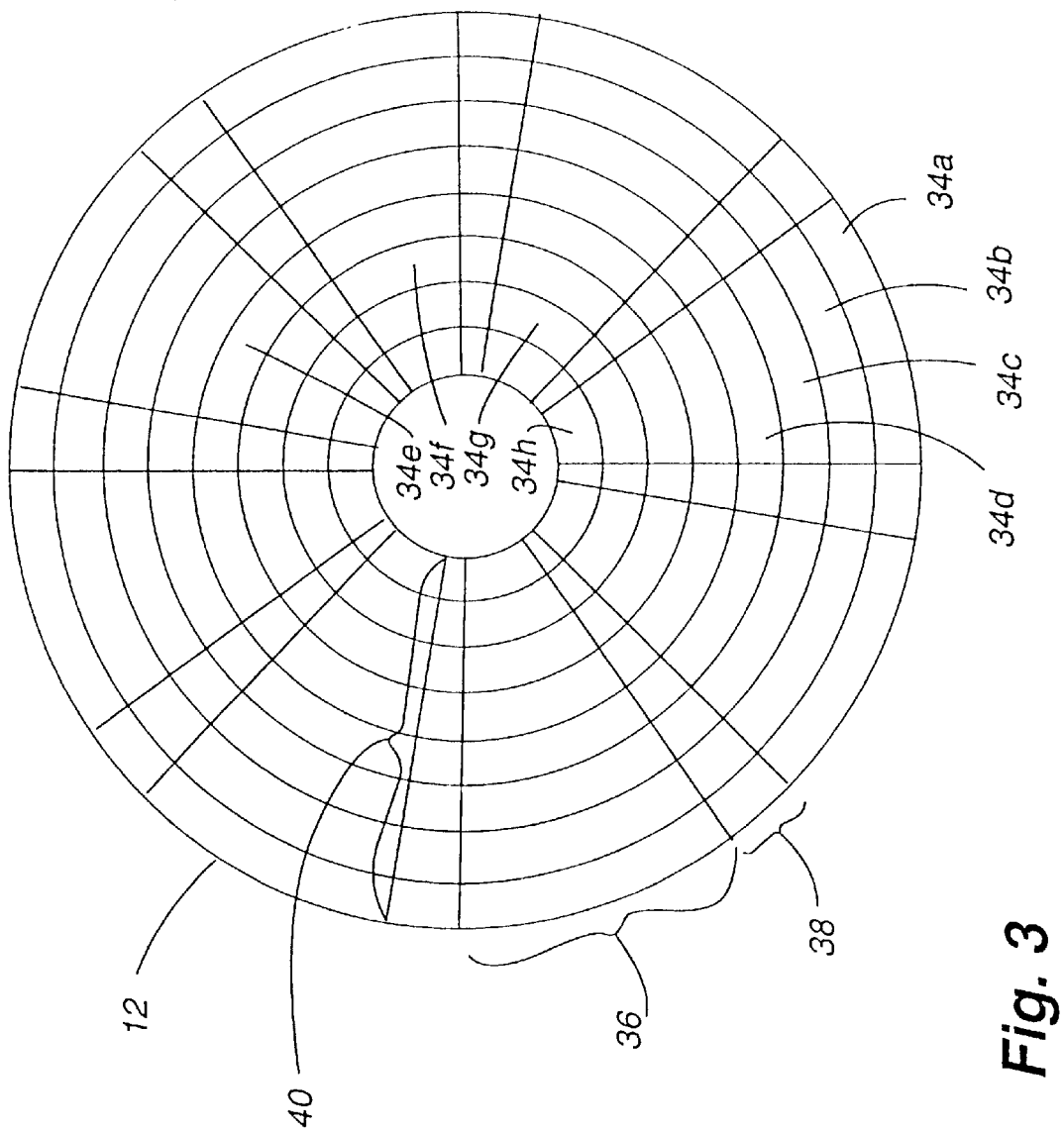
FIG. 3 is a top view of a disk illustrating a data architecture that can be used on the disks in the disk drive of FIG. 1.

FIG. 3 is a top view of a disk 12 illustrating one manner in which servo information may be stored on the disk surfaces of the disk drive system 10. As illustrated, the disk 12 includes a plurality of concentric tracks 34a–34h for storing data on the surface of the disk. Although FIG. 3 only shows a relatively small number of tracks (i.e., 8), for ease of illustration, it should be appreciated that actual disks in use today can include many thousands of tracks on the surface of a single disk 12. Each track 34 is divided into a plurality data sectors 36 and a plurality of servo sectors 38. The servo sectors 38 in each track 34 are radially aligned with servo sectors in the other tracks, thereby forming servo wedges 40 which extend radially across the disk 12. During a seek operation or a track following operation, the appropriate transducer 22 samples a servo sector each time it crosses over one. It then delivers the resulting servo information to the servo controller 28 which updates the control signal to the VCM 24 based on the new information.

In conventional sectored servo disk drive systems, each disk surface in the system has an equal number of servo sectors to all of the other disk surfaces in the system. For example, in a conventional system that stores servo information in servo wedges, such as those illustrated in FIG. 3, every disk surface has the same number of tracks and servo wedges. In conceiving of the present invention, it was discovered that by increasing the number of servo sectors on one of the disk surfaces in the drive and decreasing the number of servo sectors on all of the other surfaces in the drive, an increased servo sample rate could be achieved without increasing the overhead required by the system. This is a major improvement over hybrid systems that require that an entire disk surface be dedicated to servo information (i.e., an entire disk surface in the drive stores no user data at all). It was found that a continuous stream of servo information, as is derived from a dedicated servo surface, is not required for the servo system to perform adequately. All that is needed is a system that can perform servo updates at greater than a predetermined sampling rate. The predetermined sampling rate that is required for a particular disk drive will depend on numerous variables, such as, for example, the mass of the transducer and actuator arm, the frequency and magnitude of possible disturbances, the track density, etc. The techniques of the present invention allow the servo sampling rate to be increased to at least this predetermined rate without increasing the overhead of the system.

Figures 4A, 4B:
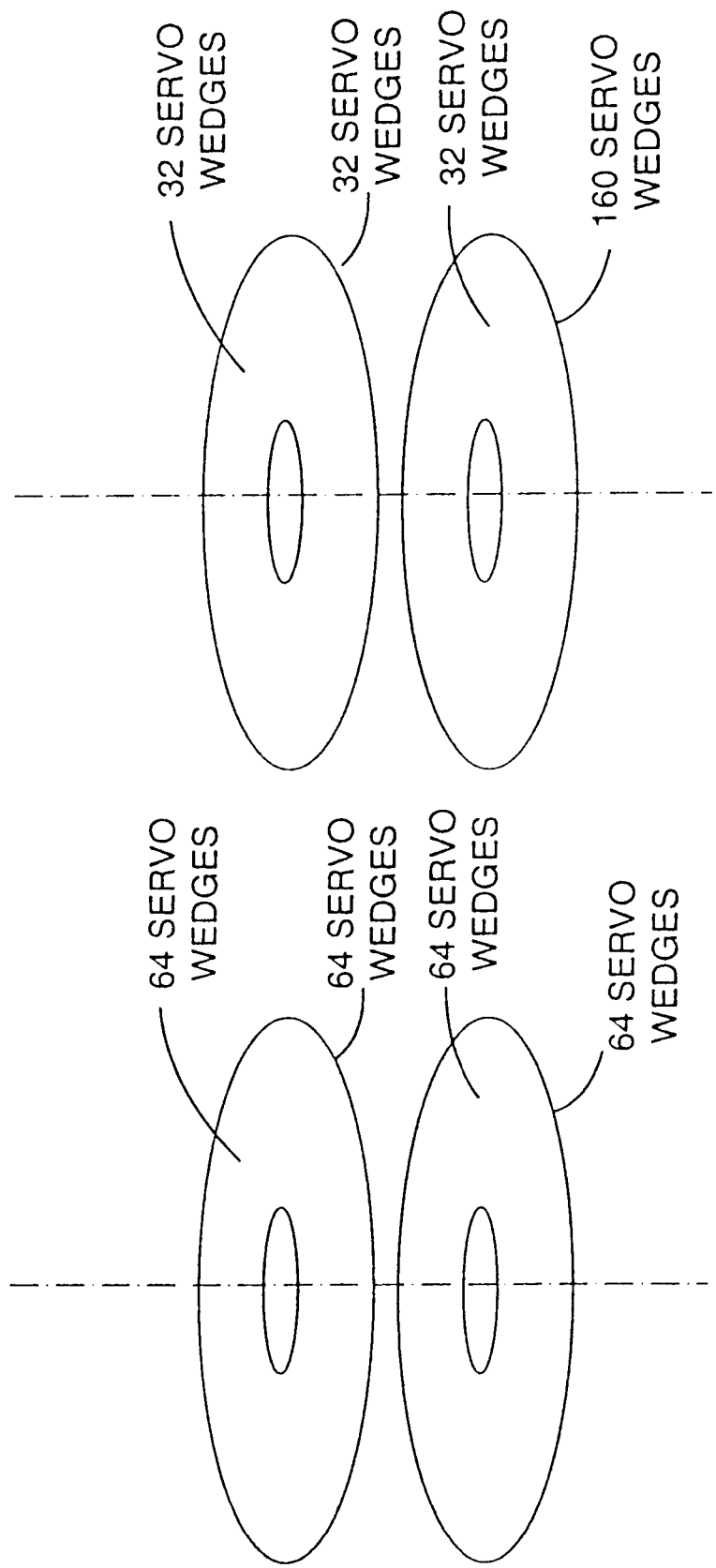
FIG. 4A is a diagram illustrating a prior art servo sector allocation scheme.
FIG. 4B is a diagram illustrating a servo sector allocation scheme in accordance with one embodiment of the present invention.

FIG. 4B illustrates an implementation of one embodiment of the present invention in a disk drive system having two disks 12. FIG. 4A shows a conventional two disk system having 64 servo wedges on each of the four surfaces in the drive. FIG. 4B shows a system in accordance with the present invention wherein the number of servo wedges on N−1 of the surfaces, where N is the total number of surfaces, has been reduced by a predetermined percentage, say X, while the number of servo wedges on the last surface has been increased by (N−1) times X. That is, the number of wedges on the first three surfaces was reduced by 50 percent to 32 wedges and the number of wedges on the fourth surface was increased by three times 50 percent, or 150 percent, to 160 servo wedges.

In a system using a disk rotation speed of 5040 RPM, the above described embodiment results in a corresponding increase in servo sampling rate from 5,376 Hz to 13,440 Hz. If the VCM 24 has a bandwidth of 2000 Hz, the invention has produced an increase in the sampling ratio from 2.68 to 6.72, which can significantly increase the systems ability to reject disturbances. As is apparent, there has been no increase in overhead in going from the implementation of FIG. 4A to the implementation of FIG. 4B. In addition, overhead in the system can actually be decreased if the number of servo wedges on the last surface is increased by less than (N−1) times X.

Figures 5A, 5B:
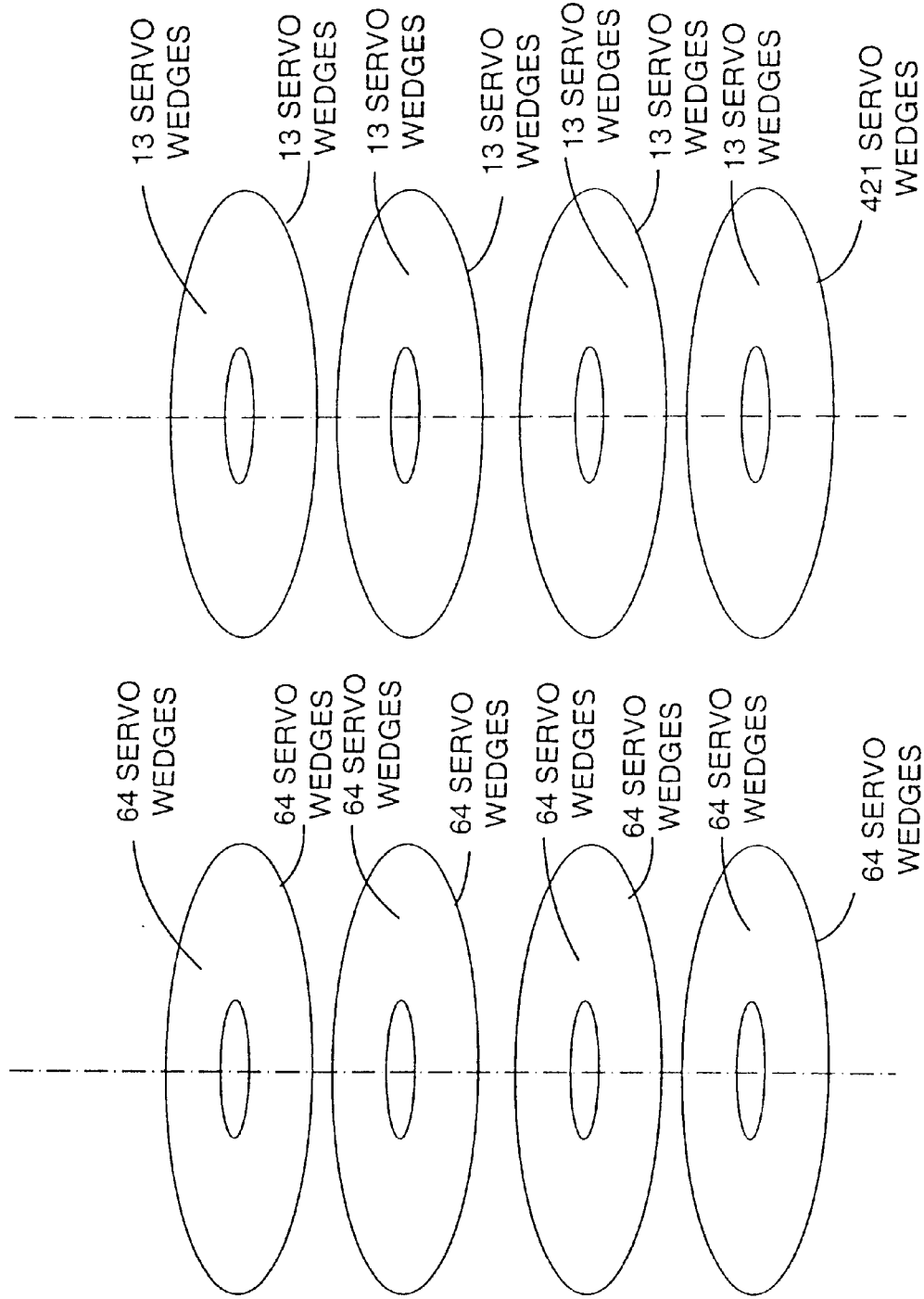
FIG. 5A is a diagram illustrating another prior art servo sector allocation scheme.
FIG. 5B is a diagram illustrating a servo sector allocation scheme in accordance with another embodiment of the present invention.

FIG. 5B illustrates an implementation of another embodiment of the present invention in a system having four disks. FIG. 5A shows a conventional four disk system wherein each disk surface includes 64 servo wedges. FIG. 5B shows a system in accordance with the present invention where the number of servo wedges on 7 (i.e., N−1) of the eight surfaces has been reduced by 80 percent, while the number on the last surface has been increased by 7×80 percent=560 percent. This results in an increase in the servo sampling rate from 5,376 Hz to 35,364 Hz and an increase in the sampling ratio from 2.68 to 17.68.

In choosing the fixed percentage by which to reduce the number of servo wedges on the N−1 disk surfaces, consideration must be given to the frequency with which the control signal to the VCM must be updated to adequately compensate for thermal drift between transducers and repetitive runout. That is, it must be determined whether the number of servo wedges on the N−1 disk surfaces is large enough to adequately compensate for thermal drift effects and repetitive runout. In this regard, the minimum number of servo wedges on each of the N−1 disk surfaces must be 2.

Figure 6:
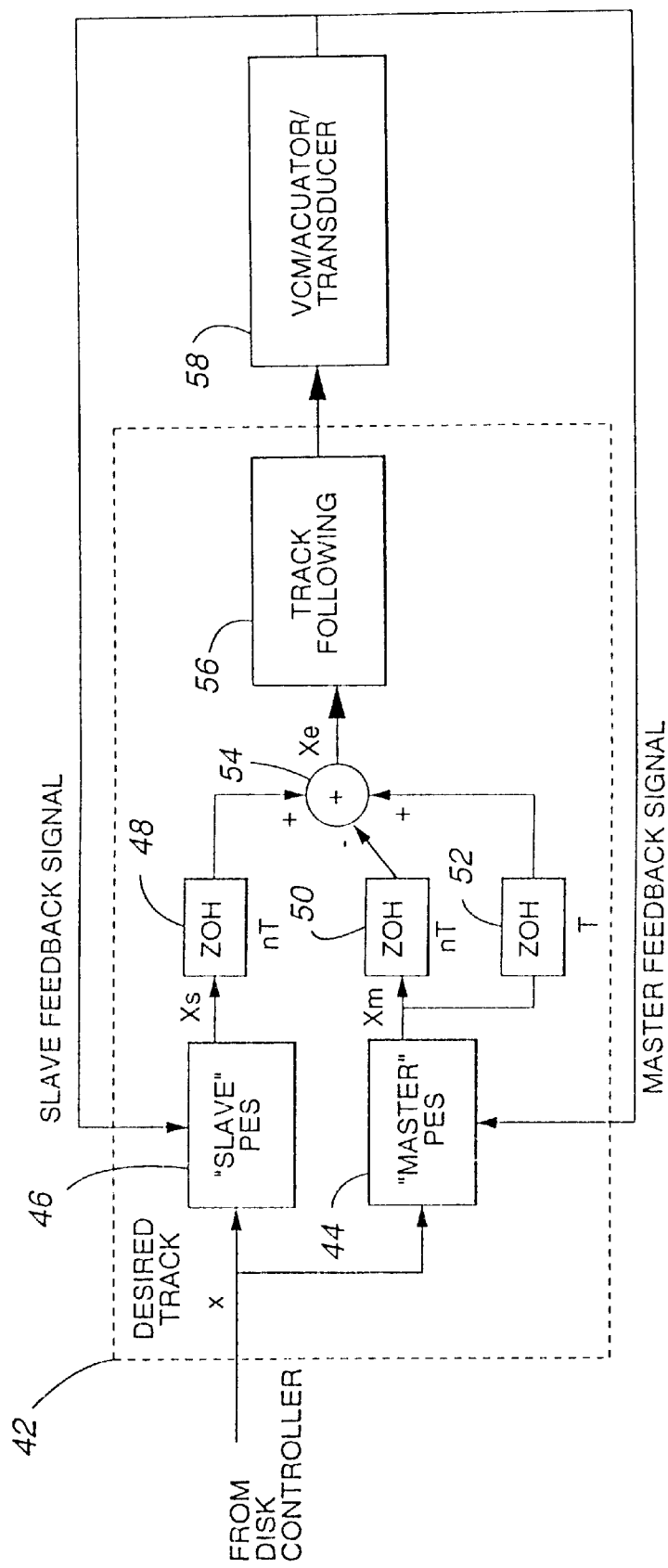
FIG. 6 is a block diagram illustrating circuitry for combining a master feedback signal and a slave feedback signal in accordance with one embodiment of the present invention.

To implement the present invention, combining means must be provided for combining a servo feedback signal derived from the "populated" disk surface (i.e., the master feedback signal) and a servo feedback signal derived from one of the N−1 surfaces (i.e., the slave feedback signal) to create a transducer position control signal. In general, the combining means will be used whenever a data sector on one of the N−1 surfaces is being accessed by a host. If the populated disk surface is being accessed, than only the master feedback signal is needed to create the transducer position control signal. FIG. 6 is a block diagram illustrating combining circuitry 42 that is used in one embodiment of the present invention. The combining circuitry 42 resides in both the read/write channel 26 and the servo controller 28 of FIG. 2. The circuitry 42 includes: a master position error signal (PES) unit 44, a slave PES unit 46, a plurality of zero order hold (ZOH) units 48–52, an addition/subtraction unit 54, and a track following unit 56. Switching means (not shown) may also be provided for delivering the proper slave feedback signal (i.e., the signal corresponding to the disk surface being accessed) to the slave PES unit 42.

Both the master PES unit 44 and the slave PES unit 46 receive a signal from the disk controller 30 indicating the desired location (i.e., the desired track) of the appropriate transducer 22. In addition, the master PES unit 44 receives the master feedback signal derived from the populated disk surface and the slave PES unit 46 receives the slave feedback signal derived from the disk surface being accessed. Both the master and slave PES units 44, 46 combine the desired location information with the corresponding feedback signal to create a position error signal (PESs), Xm and Xs respectively, indicative of the distance from the present location of the transducer to the desired location. Because the feedback signals are comprised of samples, the PES signals are also comprised of samples.

The ZOH units 48–52 are operative for receiving sample values at an input and for holding the sample values until the end of an appropriate interval. In this way, the ZOH units create continuous staircase waveforms at their respective outputs. The slave PES from the slave unit 46, Xs, is delivered to ZOH 48 which holds each sample value for a period equal to the slave sampling period nT (i.e., the time period between two slave wedges). The master PES from the master unit 44 is delivered to both ZOH unit 50 and ZOH unit 52. ZOH unit 50 holds samples every slave sampling period nT while ZOH unit 52 holds samples every master sampling period T (i.e., the time period between two master wedges).

The three zero order hold output signals are next applied to the addition/subtraction unit 54 which adds the signal from ZOH unit 48 to the output signal from ZOH unit 52 and subtracts the output signal from ZOH unit 50. The addition/subtraction unit 54 thus creates a single PES which may be represented as follows:

$$Xe(kT)=Xs(nkT)+[Xm(kT)-Xm(nkT)]$$

where k is the discrete time index. In this manner, an overall PES signal is achieved that has a relatively high update rate (i.e., the master sampling rate) and that is compensated for any errors caused by positional variances between individual transducers, such as by thermal drift.

FIGS. 7A and 7B illustrate two methods for implementing the master and slave PES units 44,46 of FIG. 6. FIG. 7A shows a dual channel implementation wherein the master and the slave feedback signals are processed simultaneously in separate channels. Each channel includes a preamp 60 for amplifying the corresponding feedback signal, a read/write channel for processing the amplified signal from the preamp 60, and a servo demodulation unit 64 for performing the necessary operations on the processed feedback signal to create the PES. Although this implementation is relatively simple and straightforward, it requires that an additional PES channel be provided which adds considerably to the cost of the system.

FIG. 7B illustrates a RAM based implementation for the master and slave PES units 44, 46 that only requires one PES channel 66. As above, the PES channel 66 includes: a preamp 60, a read/write channel 62, and a servo demodulation unit 64. In addition, the implementation of FIG. 7B includes a switch 68 and a random access memory (RAM) 70. The switch 68 is connected such that either the slave feedback signal or the master feedback signal is being applied to the input of the channel 66 at any one time. During operation, the switch 68 is periodically switched between its two positions under the control of the disk controller 30. When the switch is in the position where the master feedback signal is being applied to the input of the channel 66, the resulting master PES signal is temporarily stored in the RAM 70. When the switch 68 is changed to the position where the slave feedback signal is applied to the input of the channel 66, the resulting slave PES signal is output directly from the channel 66 (i.e., the slave PES signal is not stored in the RAM 70) while the stored master PES signal is output from the RAM 70. The master and slave PES signals (i.e., Xm and Xs, respectively) are then processed as before to create a single PES signal having a relatively high update rate and that is compensated for thermal drift effects. The higher update rate results in a higher servo bandwidth and, consequently, better system performance.

Although the present invention has been described in conjunction with a preferred embodiment, it is to be understood that modifications and variations may be resorted to without departing from the spirit and scope of the invention as those skilled in the art readily understand. For example, the number of highly populated disk surfaces can be any number that is less than the total number of active disk surfaces in the disk drive and, therefore, is not limited to one surface. In addition, the invention is not limited to systems which utilize radially aligned servo sectors and may be used in any system that uses sectored servo, such as systems using split data fields, banded or zoned recording, or constant linear density (CLD) recording. Further, the invention can be used in conjunction with any type of servo positioning information, including both seek servo information and track following information. Such modifications and variations are considered to be within the purview and scope of the invention and the appended claims.

What is claimed is:

1. A disk drive for use in conjunction with a host computer, comprising:
   at least one storage disk having multiple disk surfaces for storing data, wherein each of said multiple disk surfaces of said at least one storage disk includes both servo data areas and user data areas, said servo data areas including servo sectors on said multiple disk surfaces;
   means for rotating said at least one storage disk at a substantially constant angular velocity;
   transducer means for use in transferring user data between said at least one storage disk and an exterior environment and for sampling servo data from said at least one storage disk;
   means for moving said transducer means relative to said at least one storage disk in response to a control signal; and
   servo control means for providing said control signal to said means for moving in response to servo data sampled from said at least one storage disk by said transducer means;
   wherein a first of said multiple disk surfaces includes a greater number of servo sectors than at least one other disk surface on said at least one storage disk.

2. The disk drive, as claimed in claim 1, further comprising:
   means for creating a master servo feedback signal using servo samples from said first disk surface; and
   means for delivering said master servo feedback signal to said servo control means for use in creating said control signal.

3. The disk drive, as claimed in claim 2, further comprising:
   means for creating a slave servo feedback signal using servo samples from a second disk surface that is different from said first disk surface, wherein said second disk surface includes fewer servo sectors than said first disk surface; and
   means for delivering said slave servo feedback signal to said servo control means for use in creating said control signal.

4. The disk drive, as claimed in claim 3, wherein:
said second disk surface is the disk surface that is currently being accessed by said host computer.

5. The disk drive, as claimed in claim 3, wherein:
said servo control means includes combining means for combining said master servo feedback signal and said slave servo feedback signal into a control signal.

6. The disk drive, as claimed in claim 5, wherein:
said combining means includes:
   first position error signal (PES) means for receiving said slave servo feedback signal and for converting said slave servo feedback signal into a slave PES signal; and
   second PES means for receiving said master feedback signal and for converting said master feedback signal into a master PES signal;
   wherein said slave PES signal and said master PES signal are each indicative of the present position of a corresponding transducer relative to a desired transducer position.

7. The disk drive, as claimed in claim 6, wherein:
said first PES means is separate from said second PES means.

8. The disk drive, as claimed in claim 6, wherein:
said first and second PES means include common circuitry.

9. The disk drive, as claimed in claim 8, wherein:
said first and second PES means include a common read/write channel.

10. The disk drive, as claimed in claim 8, wherein:
said second PES means includes a random access memory (RAM).

11. The disk drive, as claimed in claim 8, wherein:
said RAM is operative for storing one of said master PES signal and said slave PES signal while the other of said master PES signal and said slave PES signal is being generated.

12. The disk drive, as claimed in claim 1, wherein:
said transducer includes at least one transducer for each of said multiple disk surfaces.

13. The disk drive, as claimed in claim 1, wherein:
each of said multiple disk surfaces includes a plurality of concentric tracks, said tracks each including a group of servo sectors and a group of data sectors.

14. The disk drive, as claimed in claim 13, wherein:
said servo sectors on said multiple disk surfaces are radially aligned from track to track so that each of said concentric tracks on each disk surface includes an equal number of servo sectors as the other tracks on said disk surface.

15. The disk drive, as claimed in claim 13, wherein:
said plurality of concentric tracks on each of said multiple disk surfaces are arranged in a plurality of multi-track bands, wherein the number of servo sectors within each track of a band is equal to the number of servo sectors within the other tracks of the same band and the number of servo sectors within each track of each band is different from the number of servo sectors in each track of the other bands in said plurality.

16. The disk drive, as claimed in claim 13, wherein:
user data is stored on said tracks using constant linear density.

17. The disk drive, as claimed in claim 13, wherein:
said group of data sectors includes at least one split data field.

18. The disk drive, as claimed in claim 1, wherein:
said at least one other multiple disk surface includes all other disk surfaces on said at least one storage disk.

19. A disk drive, comprising:
at least one storage disk having multiple disk surfaces for storing data, wherein each of said multiple disk surfaces of said at least one storage disk includes a plurality of substantially concentric tracks, each track having both servo data areas and user data areas, said servo data areas being arranged in radially aligned servo wedges that each extend across said plurality of concentric tracks;
means for rotating said at least one storage disk at a substantially constant angular velocity;
transducer means for use in transferring user data between said at least one storage disk and an exterior environment and for sampling servo data from said servo data areas on said at least one storage disk;
means for moving said transducer means relative to said at least one storage disk in response to a control signal; and
servo control means for providing said control signal to said means for moving in response to servo data sampled from said at least one storage disk by said transducer;
wherein a first of said multiple disk surfaces includes a greater number of servo wedges than at least one other disk surface on said at least one storage disk.

20. The disk drive, as claimed in claim 19, wherein:
the ability of said means for moving to accurately and rapidly move said transducer is related to the rate at which said servo data areas on said tracks are sampled;
a predetermined disk drive performance level can only be achieved if the servo sample rate of the disk drive is no less than a predetermined servo sample rate; and
the number of servo data areas on each track of said first disk surface, in conjunction with said angular velocity of said at least one storage disk, produces a servo sample rate that is no less than said predetermined servo sample rate.

21. The disk drive, as claimed in claim 20, further comprising:
means for receiving an access request from a host computer for a transfer of data between said host computer and a second of said multiple disk surfaces, wherein said second disk surface is different than said first disk surface;
means, in response to said access request, for creating a master servo feedback signal using servo samples from said first disk surface;
means, in response to said access request, for creating a slave servo feedback signal using servo samples from said second disk surface; and
means, within said servo control means, for combining said master servo feedback signal and said slave servo feedback signal to produce a control signal that is based on a servo sample rate that is no less than said predetermined servo sample rate.

22. The disk drive, as claimed in claim 21, wherein:
said slave servo feedback signal is used to compensate for positional variances between transducers associated with different disk surfaces.

23. The disk drive, as claimed in claim 22, wherein:
the number of servo data areas on each track said second disk surface is no less than a predetermined number that is required to adequately compensate for said positional variances.

24. The disk drive, as claimed in claim 22, wherein:
said positional variances between transducers are caused by at least one of the following: thermal drift effects and repetitive runout.

25. The disk drive, as claimed in claim 23, wherein:
said disk drive is capable of storing more user data than disk drives that achieve said predetermined disk drive performance level using the same number of servo wedges on every track surface, because disk space on said at least one other disk surface that would otherwise be used for storing servo data is instead used for storing user data.

26. In a disk drive that includes at least one disk having a plurality of disk surfaces, each disk surface including a plurality of concentric tracks having both data sectors and servo sectors, wherein a first of said disk surfaces includes more servo sectors per track than at least one other disk surface in said plurality of disk surfaces, and wherein said disk drive also includes means for receiving an access request from a host computer requesting a transfer of data between a second disk surface, that is one of said at least one other disk surfaces, and said host computer, a means for controlling the position of a read/write transducer with respect to said second disk surface in response to said access request, comprising:
means for sampling servo sectors on said first disk surface and using said samples to create a first feedback signal;
means for sampling servo sectors on said second disk surface and using said samples to create a second feedback signal;
means for combining said first feedback signal and said second feedback signal to create a transducer position control signal; and
means for delivering said transducer position control signal to a voice coil motor, coupled to said read/write transducer, to controllably move said transducer with respect to said second disk surface;
wherein said means for controlling is capable of achieving a predetermined performance level while requiring less system overhead than past systems capable of achieving a similar performance level.

27. A storage disk, comprising:
a first surface having a plurality of substantially concentric tracks, each of said tracks on said first surface being divided into a plurality of user data portions and a plurality of servo portions, said first surface including a first total number of servo portions; and
a second surface having a plurality of substantially concentric tracks, each of said tracks on said second surface being divided into a plurality of user data portions and a plurality of servo portions, said second surface including a second total number of servo portions;
wherein said first total number of servo portions is greater than said second total number of servo portions.

28. A storage disk, comprising:

a first surface having a plurality of substantially concentric tracks, each of said tracks on said first surface being divided into a plurality of user data portions and a plurality of servo portions, said first surface including a first total number of servo portions; and a second surface having a plurality of substantially concentric tracks, each of said tracks on said second surface being divided into a plurality of user data portions and a plurality of servo portions, said second surface including a second total number of servo portions;

wherein said first total number of servo portions is greater than said second total number of servo portions and wherein said second total number of servo portions is sufficient in number to enable a repeatable run-out of said second surface to be read.

* * * * *